United States Patent [19]

O'Connor

[11] 4,013,862
[45] Mar. 22, 1977

[54] TRANSVERSELY AND ANGULARLY ADJUSTABLE TOOL HOLDER EDM ELECTRODES

[76] Inventor: Thomas J. O'Connor, 100 Morgan Road, Ann Arbor, Mich. 48106

[22] Filed: Jan. 17, 1975

[21] Appl. No.: 541,738

[52] U.S. Cl. ............................................. 219/69 E
[51] Int. Cl.² .......................................... B23P 1/08
[58] Field of Search ............ 219/69 E, 69 R, 69 G, 219/69 M, 69 V, 68; 403/43, 44, 46, 87, 90, 172; 90/16, 17; 408/187, 188, 236, 237

[56] References Cited

UNITED STATES PATENTS

| 2,922,022 | 1/1960 | Mironoff | 219/69 E |
| 3,443,054 | 5/1969 | O'Connor | 219/69 E |
| 3,474,215 | 10/1969 | Johanson | 219/69 E |
| 3,594,537 | 7/1971 | Morgenegg | 219/69 E |

Primary Examiner—Bruce A. Reynolds
Attorney, Agent, or Firm—Whittemore, Hulbert & Belknap

[57] ABSTRACT

A tool holder for supporting a tool for both sliding and pivotal movement in two relatively perpendicular directions including a generally cylindrical base having a dovetail connecting portion on one end thereof and a double diameter recess in the other end thereof, a generally cylindrical tool supporting member having a radially outwardly extending flange on one end thereof fitting within the larger diameter portion of the recess in the base, a recess extending into the one end of the tool supporting member, a pair of rods extending perpendicularly to each other, one extending across the smaller diameter portion of the recess in the base and the other extending across the recess in the tool supporting member, and a connecting member pivotally and slidably secured at the opposite ends thereof on the rods, two pairs of spaced apart relatively perpendicularly located pivot angle adjusting screws extending through the flange of the tool supporting member into engagement with the base, and two pairs of transverse position adjusting screws extending relatively perpendicularly to each other transversely through the base and into contact with the tool supporting member.

5 Claims, 4 Drawing Figures

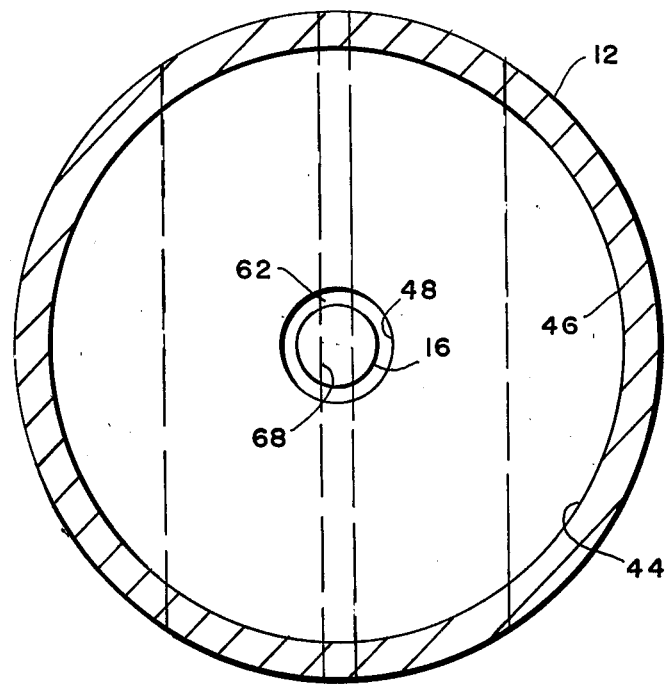
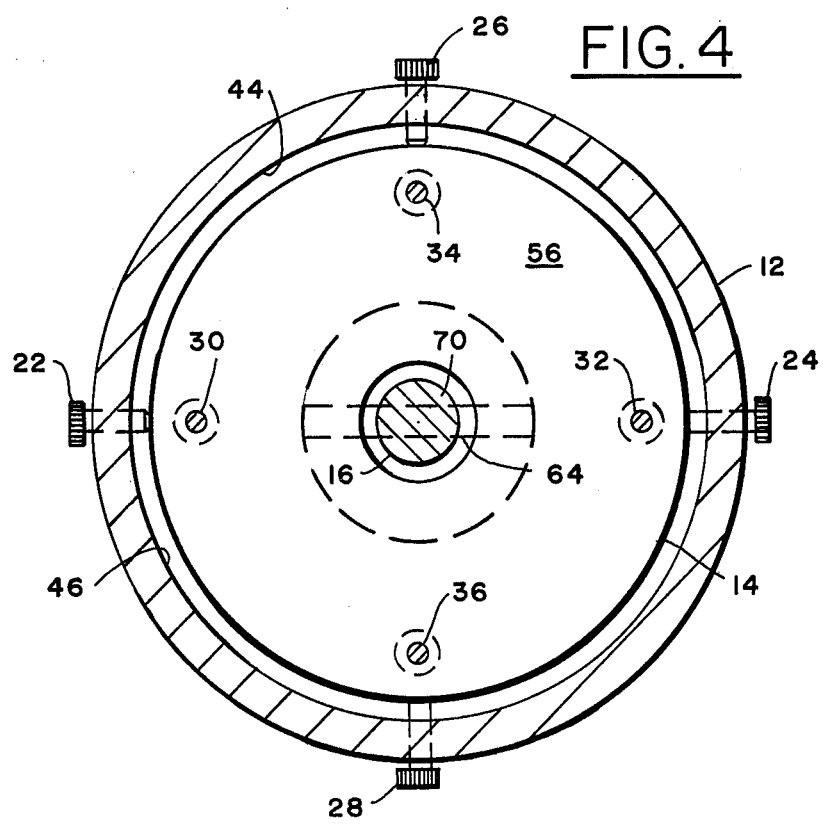

TRANSVERSELY AND ANGULARLY ADJUSTABLE TOOL HOLDER EDM ELECTRODES

BACKGROUND OF THE INVENTION

1. Field of the Invention

The invention relates to tool holders and refers more specifically to a tool holder for positioning an electrode for electrical discharge machining or the like including means for sliding the electrode along and for pivoting the electrode about two relatively perpendicular axes.

2. Description of the Prior Art

In the past, tool holders have generally been constructed to permit certain limited movement of the tool. That is, for example, tool holders have been constructed to reciprocate tools axially to move tools linearly or pivotally, or to rotate tools. Tool holders have not been constructed to permit both pivotal and linear movement of a tool. In addition, previous tool holders have been particularly complicated and therefore expensive to produce and have often been inefficient in movement of a tool.

SUMMARY OF THE INVENTION

A tool holder constructed in accordance with the invention permits both sliding and pivotal movement of a tool about two relatively perpendicular axes. The tool holder includes a cylindrical base having a dovetail connecting portion on one end thereof and a dual diameter recess in the other end thereof. Further, the tool holder includes a cylindrical tool supporting member having a radially outwardly extending flange on one end thereof received in the larger diameter portion of the recess in the base and a recess within the one end thereof. A first shaft is secured within the base and extends across the smaller diameter portion of the recess in the other end of the base. A second shaft is secured in the electrode holding member and extends across the recess in the one end of the tool supporting member. A connecting member having perpendicular openings therethrough at opposite ends thereof is slidably and angularly positioned at one end on the shaft secured to the base and at the other end on the shaft secured to the tool supporting member.

Clearance is provided between the connecting member and the smaller diameter portion of the recess in the base and between the flange of the tool supporting member and the larger diameter portion of the recess in the base to permit both transverse and pivotal movement of the tool supporting member relative to the base on the shafts in mutually perpendicular directions.

Adjustment of the transverse movement of the tool supporting member with respect to the base is accomplished by means of four spaced apart transverse adjusting screws extending perpendicular to each other transversely through the base into the larger diameter portion of the recess in the base and into contact with the flange of the tool supporting member. Pivotal adjustment of the tool supporting member on the shafts is accomplished by four spaced apart pivot angle adjusting screws extending perpendicular to each other axially of the tool holder through the flange of the electrode supporting member and into contact with the base on the abutting surface formed between the larger and smaller diameter portions of the recess in the base.

BRIEF DESCRIPTION OF THE DRAWINGS

FIG. 3 is a cross section of the tool holder of the invention, taken substantially on the line 3—3 in FIG. 1.

FIG. 4 is another cross section of the tool holder of the invention, taken substantially on the line 4—4 in FIG. 1.

DESCRIPTION OF THE PREFERRED EMBODIMENT

Figure 1:
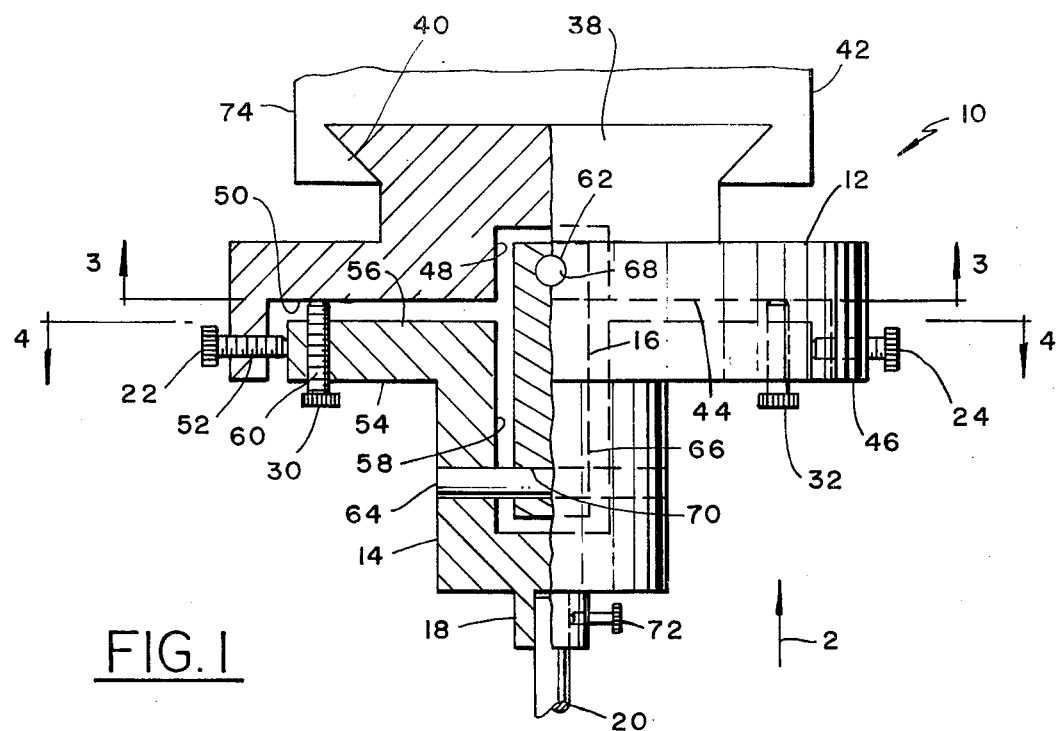
FIG. 1 is a partly broken away elevation view of the tool holder of the invention.
Figure 2:
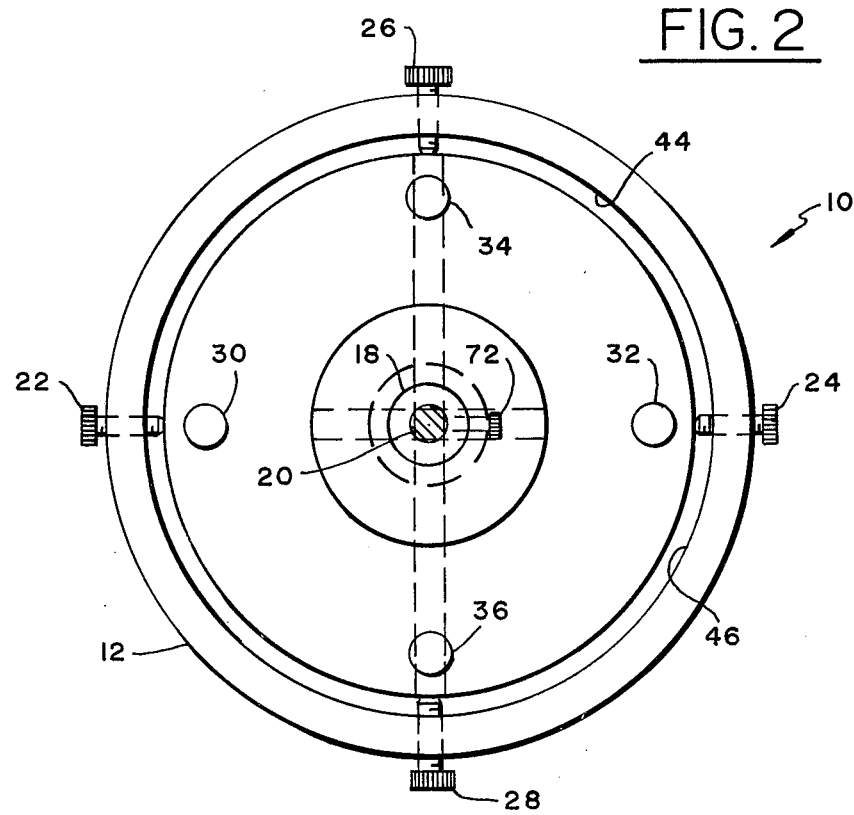
FIG. 2 is a bottom view of the tool holder of the invention, taken in the direction of arrow 2 in FIG. 1.

As shown best in FIG. 1, the tool holder 10 of the invention includes a base 12, supporting member 14 for supporting a tool such as electrical discharge machining electrode 20, and connecting means 16 for supporting the tool supporting member 14 from the base 12 in relative transverse and pivotal positions in two relatively perpendicular directions.

The tool holder 10 also includes the structure 18 for securing the electrical discharge machining electrode 20 to the tool supporting member 14, and two pairs of relatively perpendicularly positioned transverse position adjusting screws 22 and 24, and 26 and 28, respectively, and two pairs of relatively perpendicularly positioned pivot angle adjusting screws 30 and 32, and 34 and 36, respectively.

As shown, the base 12 is generally cylindrical and includes a dovetail mounting portion 38 on one end thereof operable in conjunction with a mating dovetail end 40 on an electrical discharge machining ram 74 or the like to secure the tool holder 10 to the ram by means of the transversely adjustable side 42 of the mating dovetail portion 40 on the ram.

The base 12 also includes the dual diameter recess 44 in the other end thereof having the larger diameter portion 46 and the smaller diameter portion 48, with the transition portion 50 forming an abutment therebetween. Threaded openings 52 are provided extending transversely through the base 12 into the larger diameter portion 46 of the recess 44 at 90 degree locations therearound to receive the horizontal location adjusting screws 22, 24, 26 and 28.

The tool supporting member 14, which is also cylindrical, includes the radially extending flange 54 at one end 56 thereof and includes the recess 58 extending into the one end 56. Threaded openings 60 are provided to receive the pivot angle adjusting screws 30, 32, 34 and 36 at relative perpendicular locations spaced 90° with respect to each other around the flange 54, as shown.

The connecting means 16 includes the first cylindrical shaft 62 extending transversely of and secured in the base 12. Shaft 62 extends through the small diameter portion 48 of the recess 44 in the base 12. The connecting means 16 further includes the second cylindrical shaft 64 extending transversely through the tool supporting member 14 across the recess 58 therein perpendicular to the shaft 62, as shown. Further, the connecting means 16 includes the cylindrical connecting member 66 having relatively perpendicular openings 68 and 70 extending therethrough through which the shafts 62 and 64, respectively, slidably and pivotally pass.

It will be noted that clearance is provided in the samll diameter portion 48 of the recess 44 in the base 12 and in the recess 58 in the end 56 of the tool supporting member 14 to permit movement of the tool supporting member 14 in relatively perpendicular transverse directions on sliding movement of the connecting member 16. Similarly, clearance is provided between the tool supporting member 14 and the base 12 to permit pivotal movement of the tool supporting member 14 with respect to the base 12 on the shafts 62 and 64 in relatively perpendicular directions.

In overall use of the tool holder 10, the electrode 20 is secured to the tool supporting member 14 by means of the set screw 72 in the structure 18. The horizontal position of the electrode 20 is then adjusted by means of the screws 22, 24, 26 and 28, and the pivot angle of the electrode 20 is adjusted by means of the adjusting screws 30, 32, 34 and 36. The tool 10 may, of course, then be moved in whatever manner is permitted by the ram 74.

As will be understood in the art, the body of the ram 40 may be insulated as for example shown in U.S. Pat. Nos. 3,222,494 and 3,479,479 from the tool holder 10, and the electrode 20 may be connected in an electrical discharge machining circuit as shown in U.S. Pat. No. 3,167,632.

While one embodiment of the present invention has been considered in detail, it will be understood that other embodiments and modifications thereof are contemplated by the inventor. It is the intention to include all embodiments and modifications as are defined by the appended claims within the scope of the invention.

What I claim as my invention is:

1. A tool holder for supporting an electrode for electrical discharge machining or the like, comprising a base, a tool supporting member, and means operable between the base and tool supporting member for supporting the tool supporting member on the base for both transverse movement in two relatively perpendicular directions and pivotal movement about two relatively perpendicular pivot axes comprising a first shaft secured to said base, a second shaft secured to said tool supporting member and extending axially perpendicular to said first shaft, and a connecting member having a pair of openings therethrough extending perpendicular to each other receiving said first and second shafts therein.

2. Structure as set forth in claim 1, and further including means for adjusting the pivotal movement of the tool supporting member with respect to the base comprising two pairs of screws extending through said tool supporting member and into engagement with said base, which screws are angularly spaced apart 90° with respect to each other.

3. Structure as set forth in claim 2, and further including means for adjusting the transverse movement of the tool supporting member with respect to the base comprising two pairs of screws extending transversely through the base into engagement with the tool supporting member, which screws are angularly spaced apart 90° with respect to each other with each pair defining a separate straight line and with the defined lines being perpendicular to each other.

4. Structure as set forth in claim 3, wherein the base is provided with a circular recess in the bottom thereof having a smaller diameter portion and an outer enlarged diameter portion and wherein the tool supporting member has a radially outwardly extending flange on one end thereof positioned within the larger diameter portion of the recess in the base and said tool supporting member has a recess in the one end thereof and the first shaft extends transversely of the base within the smaller diameter portion of the recess therein, the second shaft extends transversely of the tool supporting member within the recess in the one end thereof and the connecting member extends at opposite ends into the smaller diameter portion of the recess in the base and into the recess in the one end of the tool supporting member.

5. Structure as set forth in claim 1, and further including means for adjusting the transverse movement of the tool supporting member with respect to the base comprising two pairs of screws extending transversely through the base into engagement with the tool supporting member, which screws are angularly spaced apart 90° with respect to each other with each pair defining a separate straight line and with the defined lines being perpendicular to each other.

* * * * *